United States Patent [19]
Emly et al.

[11] Patent Number: 5,268,334
[45] Date of Patent: Dec. 7, 1993

[54] PRODUCTION OF BERYLLIUM OXIDE POWDERS WITH CONTROLLED MORPHOLOGY AND QUALITY

[75] Inventors: Mark N. Emly, Fremont; Donald J. Kaczynski, Oak Harbor, both of Ohio

[73] Assignee: Brush Wellman, Inc., Cleveland, Ohio

[21] Appl. No.: 797,532

[22] Filed: Nov. 25, 1991

[51] Int. Cl.$^5$ .................................................. C04B 35/00
[52] U.S. Cl. ....................................... 501/1; 501/123; 423/624
[58] Field of Search ....................................... 501/1, 123

[56] References Cited

U.S. PATENT DOCUMENTS

| | | | |
|---|---|---|---|
| 1,823,864 | 9/1989 | Sawyer | 264/82 |
| 1,925,920 | 9/1933 | Gadeau | 23/24 |
| 2,312,297 | 2/1943 | Kawecki | 23/22 |
| 2,468,475 | 11/1949 | Kawecki | 75/150 |
| 3,145,098 | 8/1964 | Raine | 75/150 |
| 3,169,059 | 2/1965 | Raine | 75/150 |
| 3,172,728 | 3/1965 | Schwenzfeier | 23/183 |
| 3,233,970 | 2/1966 | Kida | 23/18.3 |
| 3,259,456 | 7/1966 | Maddox | 23/88 |
| 3,334,997 | 8/1967 | Caillat | 75/150 |
| 3,431,073 | 3/1969 | Kobayashi | 23/183 |
| 3,634,532 | 1/1972 | Ogino | 260/672 |
| 3,685,988 | 8/1972 | Frenkel | 75/150 |
| 3,718,441 | 2/1973 | Landingham | 29/182.1 |
| 4,762,656 | 9/1988 | Ballard | 264/82 |

FOREIGN PATENT DOCUMENTS

1510308  2/1966  France .

OTHER PUBLICATIONS

"Beryllium and Beryllium Alloys", *Kirk-Othmer Encyclopedia of Chemical Technology*, 3rd Ed., vol. 3, pp. 803-823.

H. C. Kawecki, "The Fluoride Extraction of Beryllium from Beryl", *The Metal Beryllium*, Ch. IV, Part B, White and Burke (1955).

C. W. Schwenfeier, Jr., "The Sulphate Extraction of Beryllium from Beryl", *The Metal Beryllium*, Ch. IV, Part C, White and Burke (1955).

Kaczynski and Walsh, "Beryllium Oxide", presented at Conference on Raw Materials for Advanced and Engineered Ceramics, *Ceramic Engineering and Science Proceedings*, pp. 1261-1269.

Bhat and Moorthy, "Influence of Minor Additions and Calcination Temperature of Beryllia on Powder Properties", *Trans. Ind. Ceram. Soc.*, vol. 40(5), pp. 161-165 and 174 (1981).

*Primary Examiner*—Karl Group
*Assistant Examiner*—Chris Gallo
*Attorney, Agent, or Firm*—Hopgood, Calimafde

[57] ABSTRACT

A process for producing beryllium oxide (BeO) from beryllium hydroxide (Be(OH)$_2$) in a single reactive step. Beryllium hydroxide powder is mixed with a calcination additive containing Mg and/or Ca and calcined at 1000°–1300° C. The resultant oxide pow-der is characterized by low fluorine content (<100 ppm), low surface area (<1.5 m$^2$/g) and a controlled particle size of 2 μm to 25 μm.

16 Claims, 15 Drawing Sheets

PRODUCTION OF BERYLLIUM OXIDE POWDERS WITH CONTROLLED MORPHOLOGY AND QUALITY

BACKGROUND OF THE INVENTION

1. Field of the Invention

This invention relates to a single step process for making beryllium oxide from the hydroxide form.

2. State of the Art

Beryllium oxide, also known as beryllia, is an important amphoteric oxide. It reacts with acids to form salts and with alkalis to form compounds known as beryllates. Beryllium oxide is used in the production of beryllium and beryllium-based compounds such as beryllium-copper alloys. End-use applications for BeO are directed to transistors, electron tubes, semiconductor packages, resistor cores, organic catalysts, windows for klystron tubes and high temperature reactor systems. BeO is a unique ceramic material. It has beneficial mechanical, thermal and electrical properties. The BeO powder can be fabricated into finished shapes which are transparent to microwave and gamma radiation.

Beryllium oxide is conventionally produced from beryllium hydroxide. But, until now, art-recognized techniques have provided BeO powders containing elevated levels of fluorine or other impurities which are unacceptable for high density beryllium oxide ceramics. Commercial practices for recovery of beryllium hydroxide $(Be(OH)_2)$ from beryl ore are described in *The Metal Beryllium*, White and Burke, American Society For Metals (1955). Gadeau U.S. Pat. No. 1,925,920 discloses a modification of the art-recognized Copaux process. It describes beryllium hydroxide preparation from beryl ore which is reacted with sodium fluorosilicate at 650°–700° C. The reaction mass is water leached to solubilize beryllium as a solution of sodium fluoroberyllate. Dry sodium fluoroberyllate is mixed with sodium carbonate and recalcined between 525° and 550° C. The second calcination product is water leached to solubilize sodium fluoride. Beryllium oxide is left as a wet paste after solid-liquid separation and several water washings of the solid. This wet paste beryllium oxide product retains elevated levels of fluoride or sodium which are unsuitable for preparing high density beryllium oxide ceramics.

H. C. Kawecki, "The Fluoride Extraction of Beryllium from Beryl," Chapter IV, Part B, *The Metal Beryllium* (1955) and U.S. Pat. No. 2,312,297 describe a modification of the Copaux process wherein beryllium is liberated from the ore by interaction of sodium ferric fluoride and sodium fluorosilicate at 750° C. A water leach of the sintered reaction mass solubilizes the beryllium in sodium fluoroberyllate. Beryllium hydroxide is recovered by adding excess sodium hydroxide (50 weight percent caustic) to the fluoroberyllate leach solution. A concentration of 20 percent by volume is achieved. The remainder of the fluoroberyllate leach solution is then added slowly to form $Be(OH)_2$ which is filtered as a granular precipitate from the warm solution.

Beryllium hydroxide from the Kawecki-Copaux process is similarly limited by the presence of impurities. The resulting product contains sodium fluoride which makes it unsuitable for direct production of ceramic-grade beryllium oxide. A further modification of this process is described in Kida U.S. Pat. No. 3,233,970. Like other prior art processes, the Kida modification produces beryllium hydroxide containing sufficient sodium fluoride or ammonium fluoride which makes it unsuitable for ceramic-grade beryllium oxide.

Bhat and Moorthy, "Influence of Minor Additions on Sintering Behaviour of BeO," *Trans. Ind. Ceram. Soc.*, Vol. 29 (3), pp. 72–78 (1970) describe the precipitation of gelatinous beryllium hydroxide by the neutralization of beryllium sulfate solution with ammonium hydroxide. A companion paper entitled "Influence of Minor Additions and Calcination Temperature of Beryllia on Powder Properties," *Trans. Ind. Ceram. Soc.*, Vol. 40 (5), pp. 161–165 and 174 (1981) discloses the addition of magnesium succinate, titanium sulfate or ferric ammonium sulfate to the beryllium sulfate solution prior to ammoniacal precipitation.

These processes typically provide impure beryllium oxide which is not suitable for advanced ceramic applications. Ammonium sulfate is a principal contaminant produced by the Bhat and Moorthy processes. Gelatinous beryllium hydroxide products formed by alkali neutralization reactions are similarly contaminated with the companion neutralization salt, generally sodium sulfate or ammonium sulfate.

Another commercial process for producing beryllium oxide is a two step process requiring the conversion of beryllium hydroxide to beryllium sulfate tetrahydrate and subsequent calcination of the hydrated sulfate to the oxide at 1100° to 1300° C. The latter reaction step produces $SO_2$, an environmentally damaging gas which requires further processing to convert the acidic off-gas to a non-hazardous form for disposal.

The previously described process can be modified by using an additive selected from urea, ammonium oxalate, ammonium acetate, and ammonium sulfate. These modifications are described in Schwenzfeier U.S. Pat. No. 3,172,728. Additives are chosen for their ability to completely vaporize during calcination, without the formation of contaminating residues. But, the use of an intermediate composition in a multi-step process is undesirable.

Brush Wellman Inc. (previously known as Brush Beryllium Corp.) used a fusion-quench process developed by Sawyer and Kjellgren to liberate the beryllium from beryl ore. This process is disclosed in U.S. Pat. No. 1,823,864. C. W. Schwenzfeier, Jr., "The Sulfate Extraction of Beryllium from Beryl," Chapter IV, Part C, *The Metal Beryllium* (1955) describes the commercial practice of this fusion-quench process and subsequent solubilization of beryllium with sulfuric acid. After treatment of the beryllium sulfate leach solution to reject aluminum, the solution is made basic by adding excess sodium hydroxide. Beryllium, which first precipitates as amorphous beryllium hydroxide, is redissolved in excess caustic as a sodium beryllate complex $(Na_2BeO_2)$. The solution is filtered, carefully diluted and boiled to precipitate a granular beryllium hydroxide which is recovered by additional filtration.

The original Sawyer-Kjellgren process was subsequently modified by applying solvent extraction technology to the sulfate leach solution. Maddox U.S. Pat. No. 3,259,456 describes the recovery of beryllium from the organic extraction solvent by separation with aqueous ammonium carbonate. The resultant ammonium beryllium carbonate solution is purified and boiled to precipitate beryllium basic carbonate. This beryllium basic carbonate is normally converted to beryllium hydroxide by a pressure hydrolysis step at 165° C.

Granular beryllium hydroxide is recovered by filtration.

Some modern beryllium hydroxide production is still based on beryl ore input. But, most commercial production is now derived from sulfuric acid leach of bertrandite ore. Beryl leach solutions can be mixed with bertrandite leach liquors prior to solvent extraction and generation of the ammonium beryllium carbonate solution. Beryllium hydroxide is formed by pressure hydrolysis of the ammonium beryllium carbonate solution. It is filtered, lightly washed and drummed as a damp granular powder containing approximately 20 percent free moisture.

Improved purity for $Be(OH)_2$ is achieved by the Maddox solvent extraction process. The beryllium hydroxide is relatively free of cationic impurities, but residual fluoride (1–2 weight percent) has prevented its direct calcination to an acceptable ceramic-grade beryllium oxide. BeO is commercially produced by a two-step process which requires the conversion of beryllium hydroxide to beryllium sulfate tetrahydrate, and subsequent calcination of the sulfate to the oxide at 1100° to 1300° C.

OBJECTS OF THE INVENTION

It is an object of the present invention to provide a process for making beryllium oxide from the hydroxide form while avoiding the obstacles and disadvantages of art-recognized techniques.

Another object of the present invention is to produce acceptable, ceramic-grade beryllium oxide powder directly from beryllium hydroxide provided by the Maddox extraction process.

It is a further object of this invention to provide a simple, single step process without the need for conversion to a sulfate intermediate.

An additional object of the present invention is to provide high purity beryllium oxide uncontaminated by fluorides or other neutralization salts.

A further object of the present invention is to provide beryllium oxide with controlled morphology.

These and other advantages are obtained by the method described in this specification.

SUMMARY OF THE INVENTION

This invention provides a process for producing beryllium oxide with a controlled mean particle size and morphology. Powdered beryllium hydroxide is admixed with a calcination additive, and the mixture is calcined to directly convert the beryllium hydroxide to beryllium oxide. Calcination is preferably accomplished in air at 1000° to 1300° C. Nitrogen, argon and hydrogen are also suitable calcination atmospheres. Mean particle size and morphology are controlled by the type and quantity of calcination additive, final calcination temperature and, to a limited degree, by the initial morphology of beryllium hydroxide.

The described invention also provides an additive which facilitates the direct reactive calcination of beryllium oxide from beryllium hydroxide. Calcination additives include any calcium and/or magnesium compound which forms the corresponding oxide when subject to calcination. These additives facilitate the calcination reaction and recrystallization of the beryllium oxide product. Preferred calcination additives are magnesium basic carbonate and calcium carbonate, present in amounts of 0.10% to 0.70% by weight relative to the beryllium oxide.

The resultant beryllium oxide is characterized by low fluorine content, preferably not more than about 100 ppm, low surface area, preferably not more than about 1.5 m$^2$/g, and a mean particle size in the range of 2 μm to 25 μm. Surface area depends on the precise quantity of magnesium additive and the final calcination temperature. It reflects the morphology and particle size distribution of the beryllium oxide, e.g., a low surface area powder is normally well-crystallized with a large mean size. High surface area powders are less crystallized and have lower mean particle sizes. Known ceramic comminution treatments may be applied to change the final size distribution of BeO powder.

DETAILED DESCRIPTION OF PREFERRED EMBODIMENTS

Figure 1:
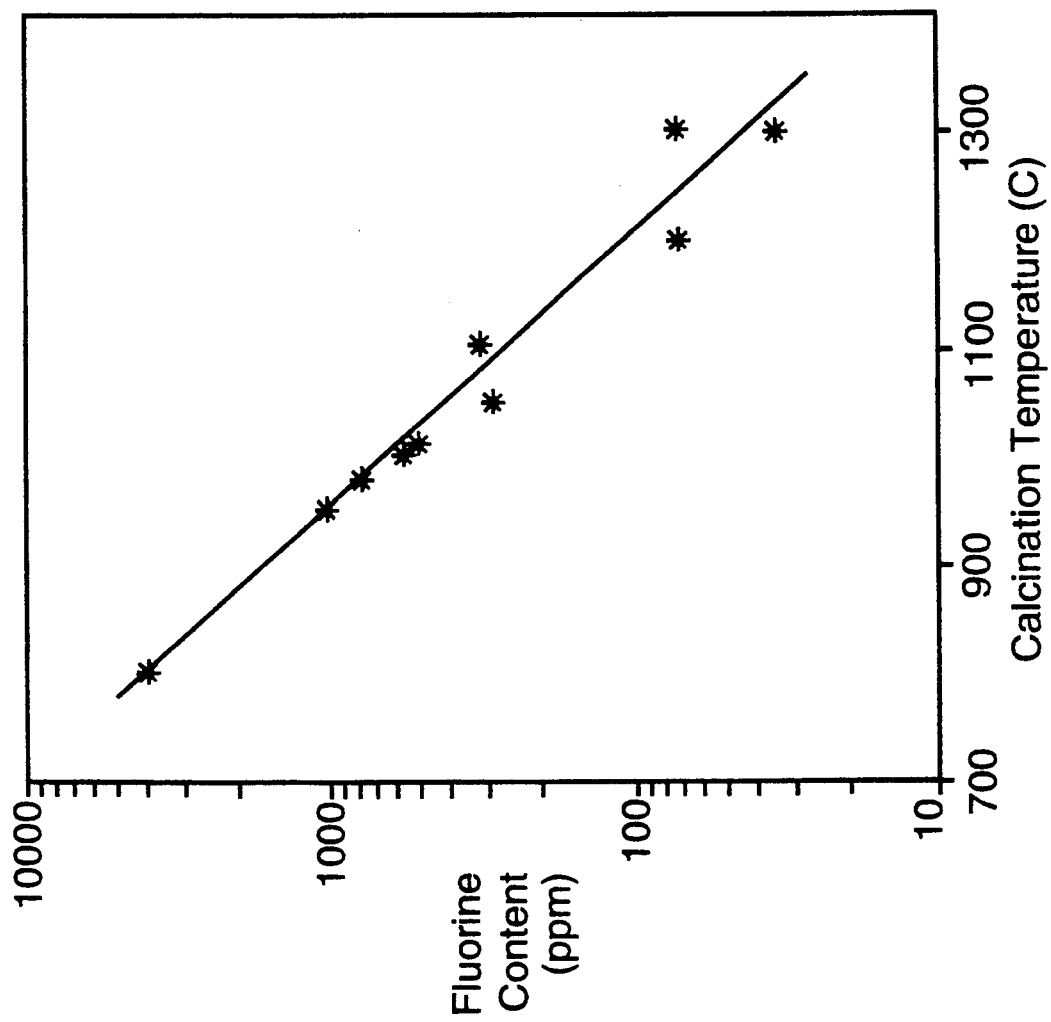
FIG. 1 shows the inverse relationship between temperature and fluorine content in beryllium oxide powders derived by unassisted calcination of beryllium hydroxide.

The present invention provides a processing additive and a method for using this additive to produce beryllium oxide (BeO) from beryllium hydroxide (Be(OH)$_2$). Beryllium hydroxide may be produced by precipitation with alkali from pure beryllium acetate solution. It may also be produced from beryllium ores according to conventional or commercially practiced extraction processes.

The preferred hydroxide material is derived from a commercial adaptation of the Maddox extraction process which uses an organic solvent to recover a basic beryllium carbonate compound from sulfate leach solutions. This compound provides the high purity input for a hydrolysis process (165° C.) which yields Be(OH)$_2$ in purified granular form. It contains 45–60% BeO (based on stoichiometric equivalence—beryllium analysis) and 10–20 percent from moisture. From a chemical viewpoint, the material is exclusively beryllium hydroxide. The chemical composition and impurity levels (in maximum parts per million) are shown below.

| Form: | BERYLLIUM HYDROXIDE Granular | BERYLLIUM CARBONATE Granular |
|---|---|---|
| Chemical Composition: | | |
| Beryllium % Min. | 15.5 | 12.0 |
| L.O.D. (at 100° C.) % Max. | 25.0 | 25.0 |
| Impurity Levels - BeO basis | | |
| Aluminum | 200 | 200 |
| Iron | 50 | 50 |
| Silicon | 300 | 300 |
| Calcium | 100 | 100 |
| Magnesium | 100 | 100 |
| Sodium | 100 | 100 |
| Zinc | 50 | 50 |
| Chromium | 10 | 10 |
| Manganese | 10 | 10 |
| Nickel | 10 | 10 |
| Zirconium | 30 | 30 |
| Titanium | 30 | 30 |
| Uranium + Thorium | 300 | 300 |
| Fluorine | 20,000 | 20,000 |
| Other elements | 100 | 100 |

The purity of input Be(OH)$_2$ must equal or exceed the lower specification for ceramic-grade BeO powders. Average particle size for Be(OH)$_2$ is important, but not critical because the material can be milled to process specifications. UOX and GCHF-grade powders have been described by Kaczynski & Walsh, "Beryllium Oxide," *Proceedings of the Conference on Raw Materials for Advanced and Engineered Ceramics*, pp. 1261–1269 (1985).

According to the present invention, beryllium hydroxide powder is mixed with a calcination additive for reaction to beryllium oxide. This additive is any calcium or magnesium compound which forms a corresponding oxide when calcined at temperatures required for conversion of Be(OH)$_2$ to BeO. The calcination additive must also provide specific recrystallizations of the BeO. Calcium or magnesium content is not lost during calcination and, in some cases, the Ca or Mg may function as a sintering aid for the beryllium oxide.

Wet mixing or pugging of the magnesium or calcium compound with Be(OH)$_2$ is preferred, but not mandatory. The wet mixture can be dewatered by filtration or equivalent methods. The additive should remain fairly insoluble to prevent losses and facilitate mixing operations. Soluble compounds of magnesium or calcium, including MgO and Mg(OH)$_2$ or CaO and Ca(OH)$_2$, are not beneficial for wet mixing. These additives can be dry mixed with Be(OH)$_2$, but this procedure is less effective than wet mixing techniques.

In an alternative embodiment, soluble magnesium or calcium compounds can be wet mixed with Be(OH)$_2$ if the total solution is evaporated to prevent loss of the additive. But, it will be appreciated that MgO, Mg(OH)$_2$, CaO and Ca(OH)$_2$ are alkaline salts which significantly raise pH values when dissolved in solution.

Water soluble organic compounds of magnesium or calcium, e.g., oxalates, acetates, succinates, or similar carboxylates, are also contemplated by the present invention. Their influence on the surface area of BeO during calcination is described in Schwenzfeier U.S. Pat. No. 3,172,728 and Kobayashi U.S. Pat. No. 3,431,073 which are incorporated by reference in this specification.

Combinations of calcium and/or magnesium compounds are also suitable for the present invention. For example, magnesium succinate would act as a recrystallization agent and surface area modifier during the calcination process. Other Group IIA compounds are useful calcination additives. These include barium carbonate, beryllium basic carbonate and strontium carbonate.

Preferred magnesium compounds include the various forms of magnesium basic carbonate, such as artinite MgCO$_3$·Mg(OH)$_2$·3H$_2$O and hydromagnesite 3MgCO$_3$·Mg(OH)$_2$·3H$_2$O, as well as magnesium oxide. Alternative and useful forms of hydromagnesite are described in "Magnesium Carbonate," *Kirk-Othmer Encyclopedia of Chemical Technology*, Vol. 14, 3rd Edition, pp. 618–621 (1981). Suitable laboratory grade powders are available from commercial suppliers such as Bell (4MgCO$_3$·Mg(OH)$_2$·5H$_2$O), Sargent-Welsh (3.2MgCO$_3$·Mg(OH)$_2$·9H$_2$O), Mallinckrodt (4MgCO$_3$·Mg(OH)$_2$·4H$_2$O) and Matheson Coleman (4MgCO$_3$·Mg(OH)$_2$·5H$_2$O). A preferred calcium compound is calcium carbonate in its various forms including, by way of illustration, calcium carbonate hexahydrate or calcium hydroxide.

Additional compounds which function as preferable calcination additives are magnesium or calcium carbonates, basic carbonates or mixed carbonates. These are water-insoluble compounds which can be wet-blended with beryllium hydroxide. Other acceptable additives include magnesium or calcium oxides and hydroxides. These are water-soluble compounds which can be dry-blended with beryllium hydroxide. Magnesium or calcium organic compounds are applicable to the present invention if they do not form undesirable calcination residues.

The calcination additive is generally present in an effective amount of at least 0.10 weight percent based on the beryllium oxide. Preferably the additive is present in the range of 0.13% to 0.70% by weight (1300 to 7000 ppm). Amounts greater than about 0.70 weight percent do not have a positive or negative influence on the final product.

The addition basis is magnesium or calcium content in the final BeO product. This expression of calcium or magnesium content is consistent with reporting of impurities in BeO powder. The Mg-content of 4MgCO$_3$·Mg(OH)$_2$·4H$_2$O was calculated as 26% based on the relative molecular weights of magnesium and magnesium basic carbonate. The calculated value (26%) was confirmed by chemical analysis.

The calcination additive is admixed with Be(OH)$_2$ in the desired amount. Wet mixing is preferred, with water as a suitable medium. The water must be relatively pure and either distilled or de-ionized water is suitable. Tap water of exceptional purity might be used, but is not preferred. After the components are mixed into a homogeneous slurry, solids are filtered and recovered as a wet cake.

The resultant cake is dried and calcined at 1000° to 1300° C. for about 4 to 12 hours. Eight hours is usually sufficient to effect reactive conversion of the Be(OH)$_2$ to BeO. Calcination temperature depends on fluorine content in the Be(OH)$_2$ starting material. As shown in FIG. 1, a higher temperature results in a lower fluorine content in the final BeO product.

Figure 2:
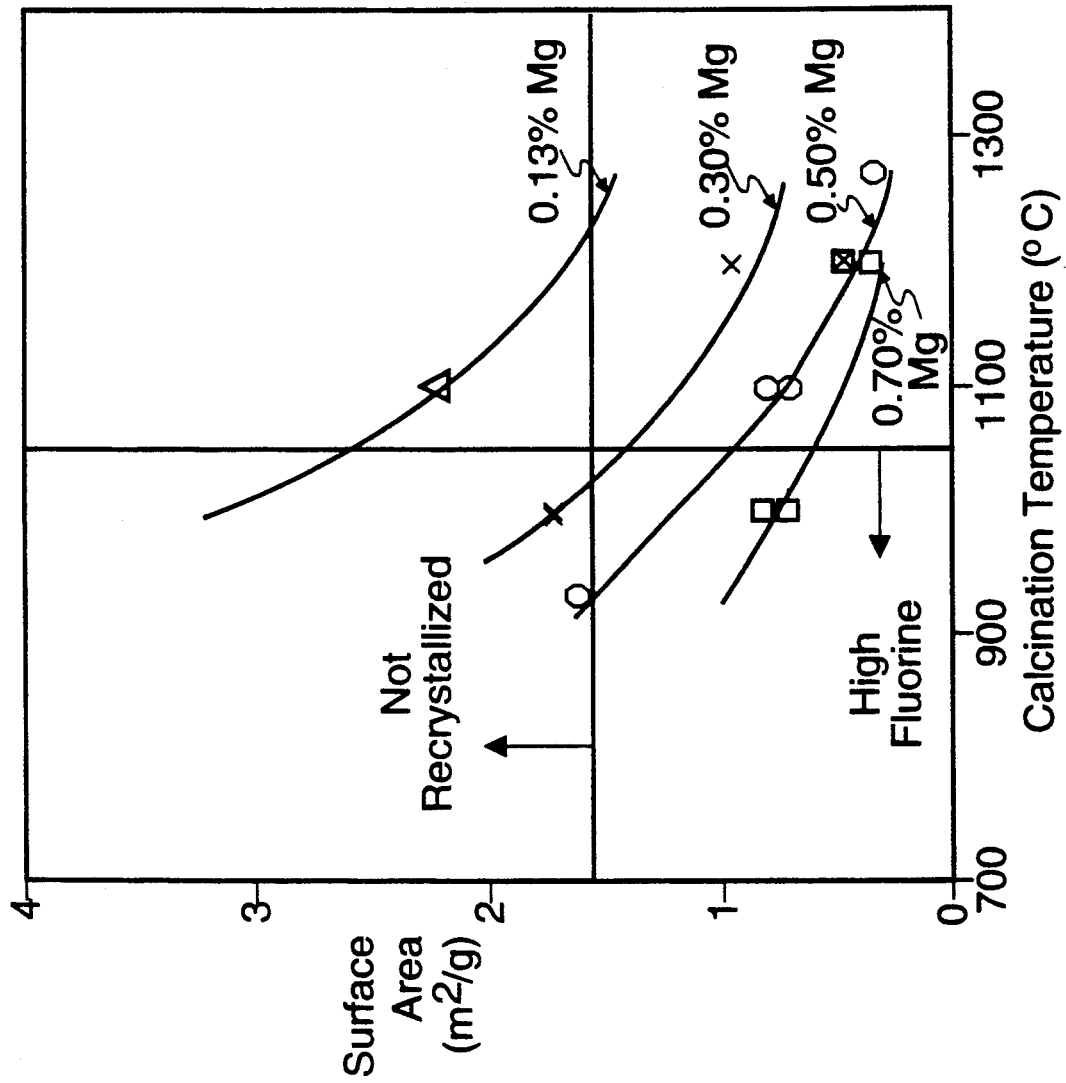
FIG. 2 shows the influence of magnesium content and calcination temperature on recrystallization of beryllium oxide.

FIG. 2 indicates that lesser amounts of the calcination additive can be used if the calcination temperature is increased. Selected operating conditions balance the cost of higher calcination temperatures against the amount of calcination additive. A lower calcination temperature of about 1000° C. is defined by minimum fluorine content in the starting material. Upper calcination temperatures are about 1500° C., with preferred temperatures in the range from about 1050° to 1300° C.

The method of the present invention produces "active" BeO powders which can be sintered to a minimum density of 95% (2.85 g/cm$^3$). These powders produce dense ceramic bodies without the need for hot pressing techniques applied to earlier powders which sintered poorly.

The calcination temperature and quantity of magnesium additive can be varied to produce BeO powders with desired surface area characteristics and fluorine content according to FIG. 2. The statistically quantified relationships shown in FIG. 2 were developed from a central composite test matrix. Twenty (20) experiments were performed to verify the effects of magnesium content and calcination conditions on final fluorine content and surface area development in the recrystallized BeO powders.

Figure 3:
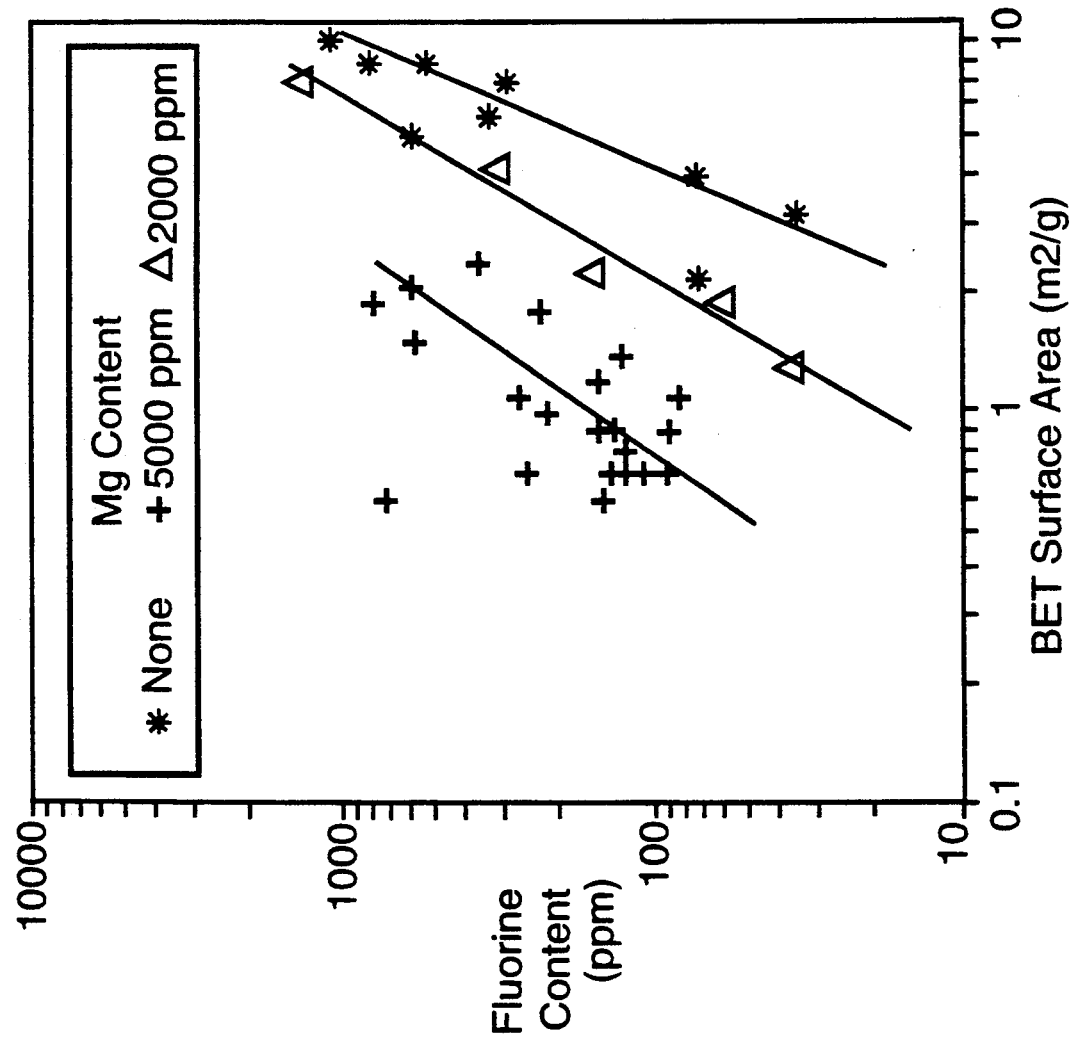
FIG. 3 illustrates the relationship between fluorine volatility and surface area development in BeO powders derived from beryllium hydroxide.
Figure 4:
FIG. 4 is a photomicrograph of $Be(OH)_2$ illustrated at 1800x magnification.

Interaction between the magnesium additive and beryllium hydroxide occurs at temperatures in excess of 800°–900° C. This interaction is understood as a solid phase reaction between magnesium oxide and beryllium oxide. Fluorine volatility and surface area morphology apparently develop at the same time. The empirical relationship between these parameters is illustrated by FIG. 3. When magnesium oxide induces beryllium oxide recrystallization, the volatility of fluorine is simultaneously increased. Based on these reaction conditions, surface area characteristics and fluorine content of the BeO powders cannot be varied in a totally independent manner.

Figure 5:
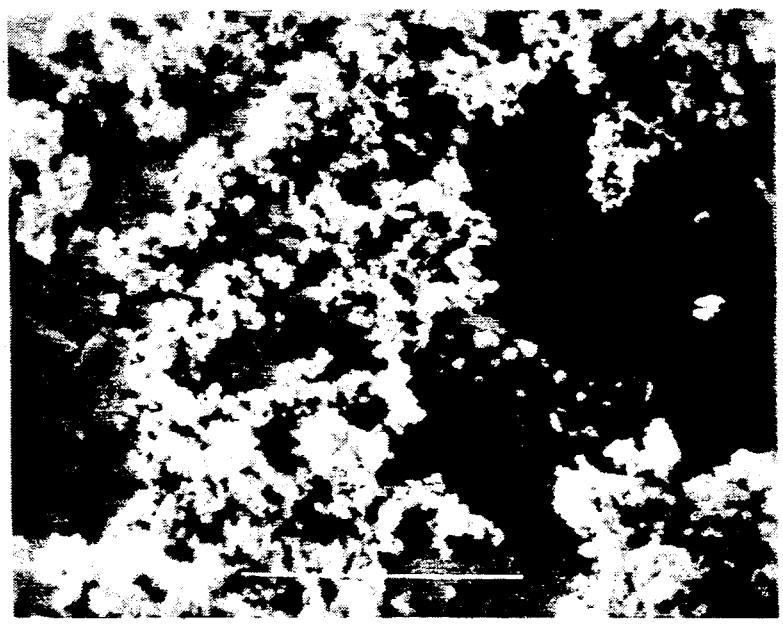
FIG. 5 is a photomicrograph of standard UOX-grade BeO powder (4000x).
Figure 6:
FIG. 6 is a photomicrograph of BeO derived from unassisted calcination of $Be(OH)_2$ (2500x).
Figure 6A:
FIG. 6A is a second photomicrograph of BeO derived from unassisted calcination of $Be(OH)_2$ (850x).
Figure 7:
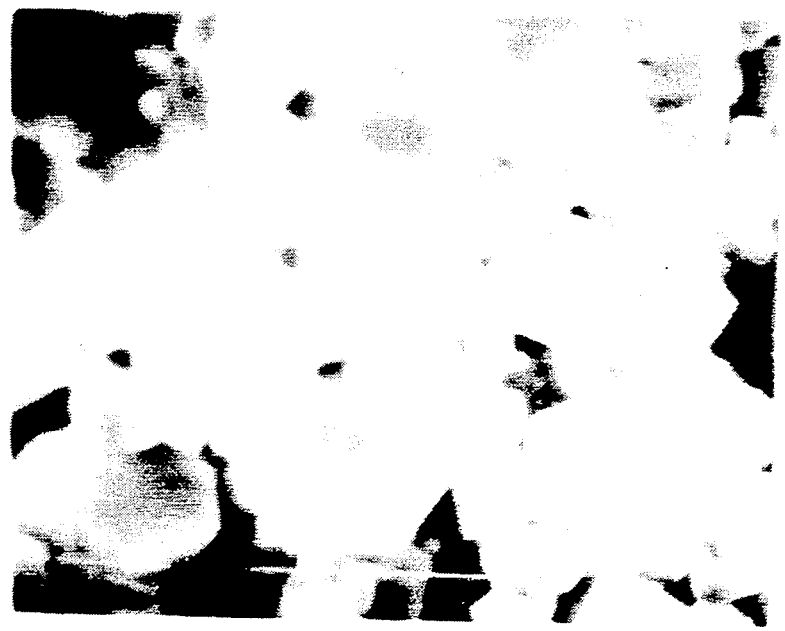
FIG. 7 is a photomicrograph of BeO derived from MgO-assisted calcination of $Be(OH)_2$ (5000x).
Figure 8A:
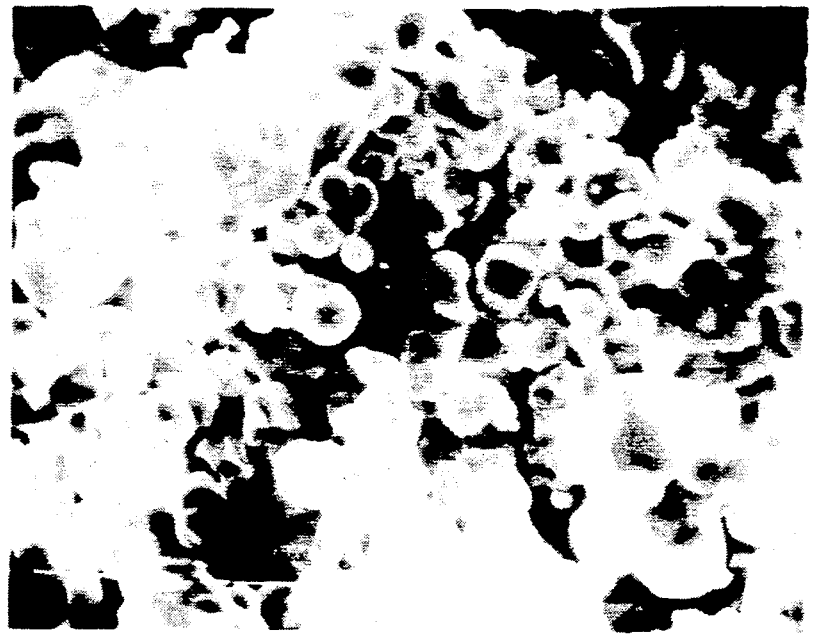
FIG. 8A is a second photomicrograph of BeO derived from $4MgCO_3.Mg(OH)_2.4H_2O$-assisted calcination of $Be(OH)_2$ (2500x).
Figure 8:
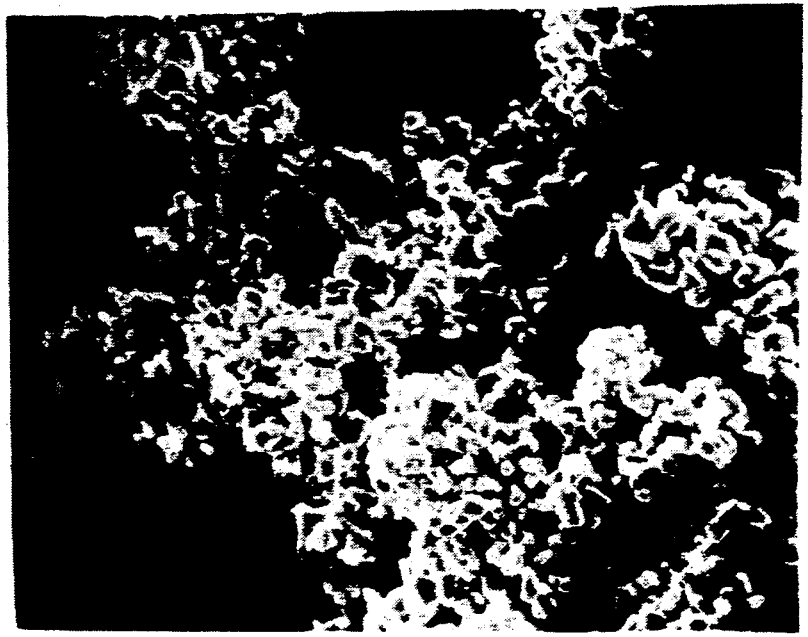
FIG. 8 is a photomicrograph of BeO derived from $4MgCO_3.Mg(OH)_2.4H_2O$-assisted calcination of $Be(OH)_2$ (850x).
Figure 9:
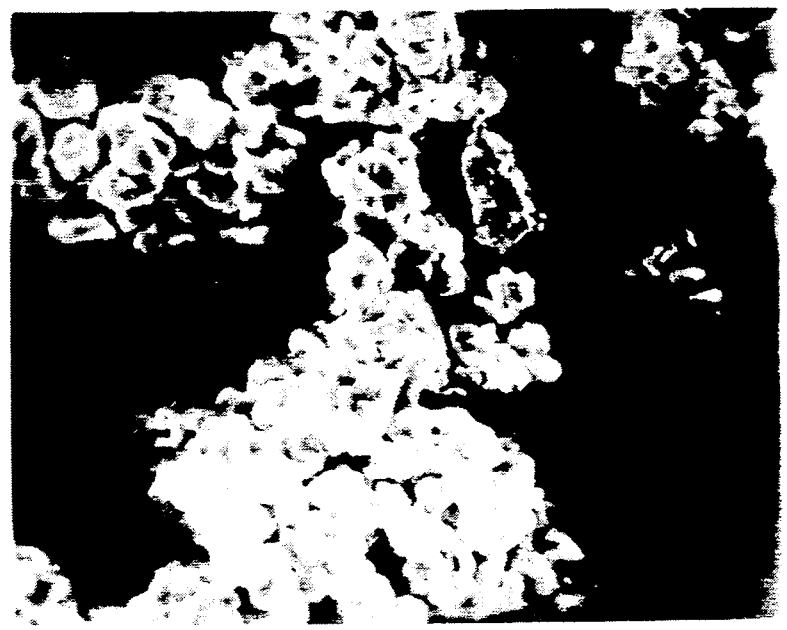
FIG. 9 is a photomicrograph of BeO derived from $CaCO_3$-assisted recrystallization of BeO (2000x).
Figure 10:
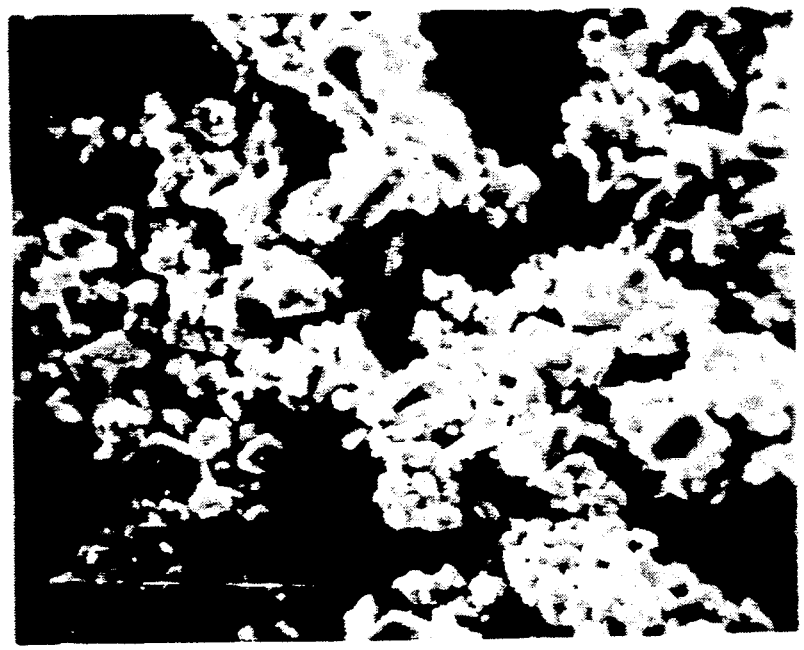
FIG. 10 is a photomicrograph of BeO derived from $4MgCO_3.Mg(OH)_2.4H_2O$-assisted calcination of Be$(OH)_2$ (2000x).
Figure 10A:
FIG. 10A is a second photomicrograph of BeO derived from $4MgCO_3.Mg(OH)_2.4H_2O$-assisted calcination of $Be(OH)_2$ (2000x).
Figure 11:
FIG. 11 is a photomicrograph of coarse BeO derived from $4MgCO_3.Mg(OH)_2.4H_2O$-assisted calcination of $Be(OH)_2$ (1800x).
Figure 12:
FIG. 12 is a photomicrograph of BeO derived from $4MgCO_3.Mg(OH)_2.4H_2O$-assisted calcination of Be$(OH)_2$ (1700x).
Figure 12A:
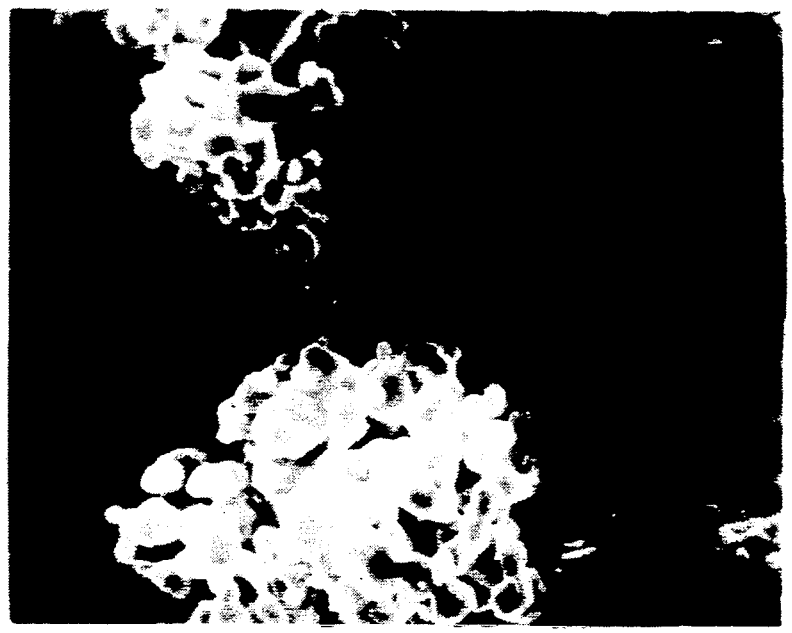
FIG. 12A is a second photomicrograph of BeO derived from $4MgCO_3.Mg(OH)_2.4H_2O$-assisted calcination of $Be(OH)_2$ (1700x).
Figure 13:
FIG. 13 is a photomicrograph of BeO derived from $4MgCO_3.Mg(OH)_2.4H_2O$-assisted calcination of Be$(OH)_2$ (1700x).
Figure 13A:
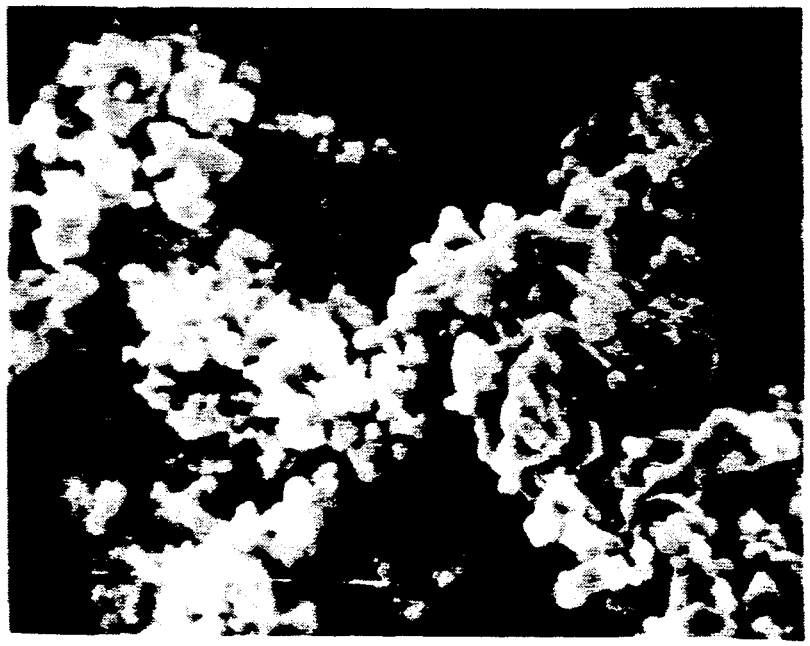
FIG. 13A is a photomicrograph of fine-sized BeO derived from $4MgCO_3.Mg(OH)_2.4H_2O$-assisted calcination of $Be(OH)_2$ (1700x).

FIGS. 4–13 are scanning electron microscope (SEM) photographs of input Be(OH)$_2$ and various BeO powders produced with and without calcination additives. These figures illustrate the different morphologies produced by the process of the present invention. They also differentiate recrystallized BeO from other products, such as UOX (FIG. 6) or unaided calcination of Be(OH)$_2$ (FIG. 5). The invention will be further illustrated by the following examples, which are not meant to limit the scope of this disclosure.

EXAMPLE 1

200 g of the described Be(OH)$_2$ powder (50% BeO) were wet-slurried with 0.5 g of reagent-grade MgO. The blended powder was dried at 110° C. and subsequently calcined in two platinum dishes at 1050° C. for 8 hours to form 100 g of BeO product. The product was further characterized as having 0.3% Mg, 104 ppm F, and a surface area of 3.2 m$^2$/g as measured by the Brunauer-Emmett-Teller (B.E.T.) surface area measurement.

EXAMPLE 2

400 g of Be(OH)$_2$ (57.5% BeO) and 4.0 g magnesium basic carbonate (Powdered, Analytical Reagent Grade, Lot 5950 KBEB) available from Mallinckrodt, Inc., Paris, Ky., were blended with sufficient water (about 400 g) to make a wet paste. The wet mixture was dried at 110° C. and then calcined in a platinum dish at 1000° C. for about 8 hours. The resulting BeO had 0.36% Mg., 95 ppm F and a surface area of 0.5 m$^2$/g.

EXAMPLE 3

39.5 g of pre-calcined beryllium oxide (250 ppm F, surface area of 5.0 m$^2$/g) was wet slurried with 0.5 g reagent grade calcium carbonate. The wet mixture was dried overnight at 110° C. and then calcined in a platinum dish at 1200° C. for 8 hours. The final beryllium oxide powder contained 0.5% Ca with a surface area of 1.0 m$^2$/g. Test cylinders of BeO were cold pressed at 30,000 psi and sintered without pressure at 1550° C. in air to 2.8 g/cm$^3$, 93% of theoretical density. This example demonstrates that the inventive process is controlled by a solid phase reaction between BeO and either CaO or MgO. Any input mixture which yields BeO and CaO or MgO is applicable to this disclosure.

EXAMPLE 4

3 kg of beryllium hydroxide (50% BeO) was wet slurried with 3 kg water and 29.3 g of laboratory grade magnesium basic carbonate (as described above). The slurry was dried at 110° C. and then crushed by hand to break up large lumps. The flowing dried powder was transferred to alumina saggers lined with BeO plates which were loaded into a periodic kiln. The temperature profile involved heating at 50° C./hr from 100° C. to 1150° C., soaking at 1150° for 8 hours, and then cooling in the furnace for 18 hours.

Figure 14:
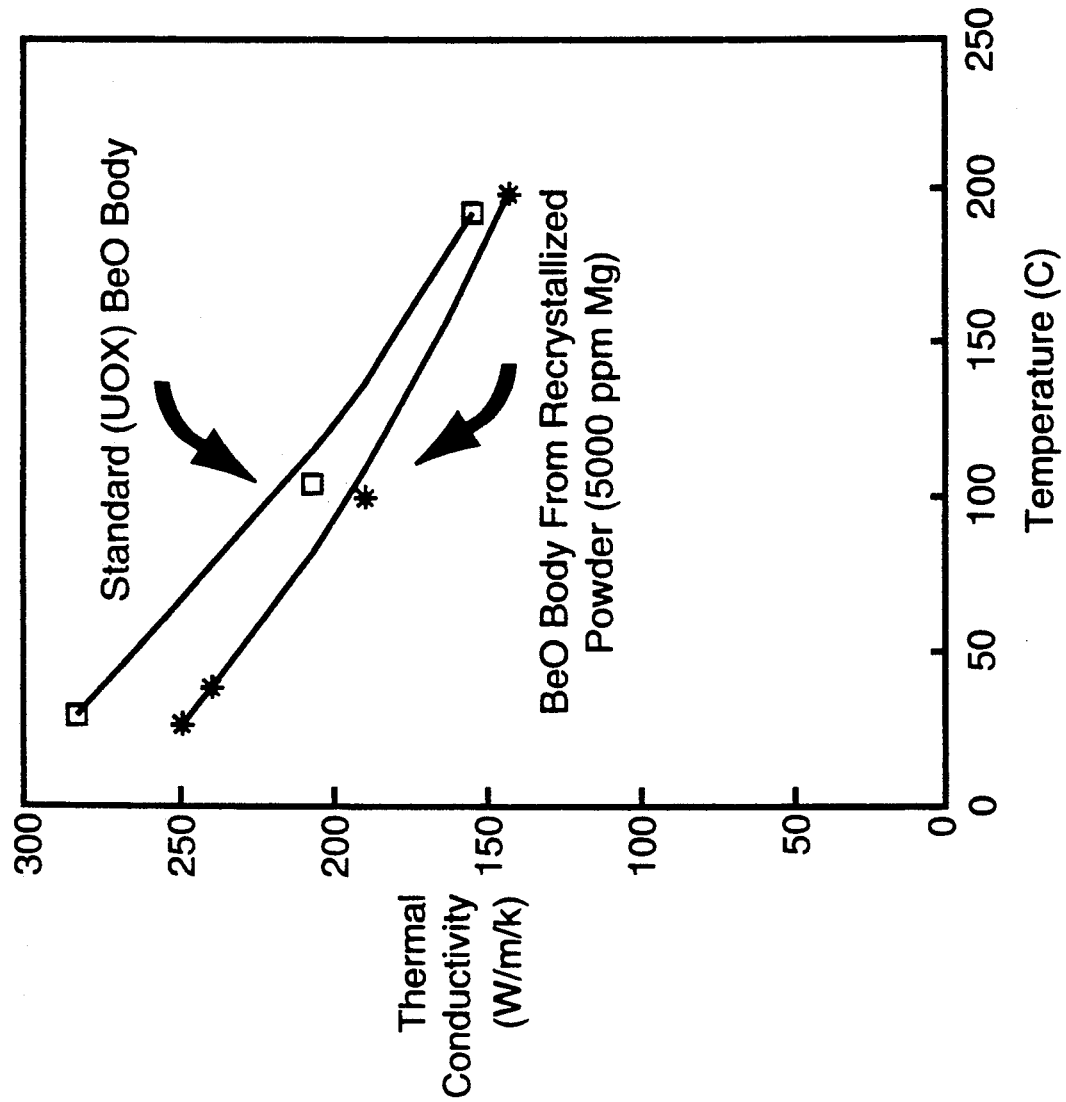
FIG. 14 illustrates the thermal conductivity for BeO fired bodies.
Figure 15:
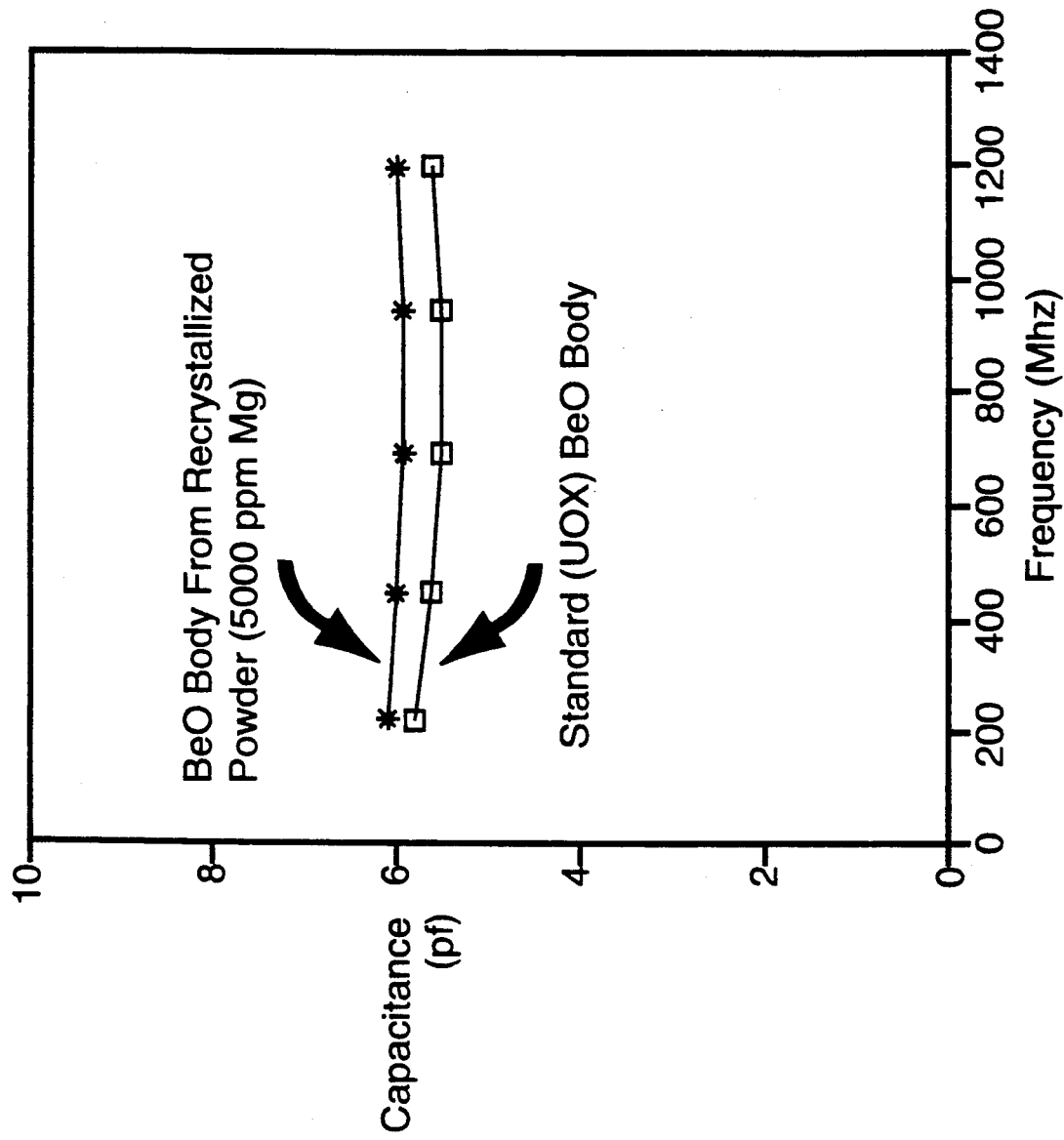
FIG. 15 illustrates the capacitance as a function of frequency for BeO fired bodies.

1.5 kg of BeO was recovered. The powder product had a surface area near 1 m$^2$/g, a median particle size of about 1 μm, a magnesium content of about 0.5%, and a fluorine content near 100 ppm. Multiple preparations of this powder were used to produce isopressed rods with densities of about 2.85 g/cm$^3$, about 95% of theoretical density. The thermal conductivities of isopressed rods prepared from standard (UOX) BeO and recrystallized BeO are shown in FIG. 14. The electrical capacitance variation with frequency is shown in FIG. 15.

EXAMPLE 5

About 45.4 kg (100 lb) of Be(OH)$_2$ containing 45% BeO was blended with about 681 g (1.5 lb) of magnesium basic carbonate (as described above) in a dispersion mixer with sufficient water to promote good mixing. The slurry was poured into BeO lined alumina saggers and calcined in a tunnel kiln with a programmed cycle of 22–24 hour heat-up to 1150° C., an 8-10 hour dwell at maximum temperature, and an 8-10 hour cool down.

The beryllium oxide calcination product had a median particle size of about 22 μm, a surface area of 0.3 m²/g and contained, on average, 0.65% Mg and 300 ppm F. The coarseness of this powder is desirable for its use in beryllium-beryllium oxide composites as described in co-pending application Ser. No. 654,328, filed Feb. 12, 1991 and incorporated by reference in the specification. These composites are useful as electronic substrates.

EXAMPLE 6

About 952.8 kg (2100 lb) of wet cake Be(OH)$_2$ (described above with 45% BeO and 10-20% free moisture) was mixed with about 4.76 kg (10.5 lb) laboratory grade magnesium basic carbonate (as described above) and sufficient water to make a slurry. The slurry was filtered on a belt filter. The resultant wet filter cake was transferred to the carhearth of a gas-fired production furnace. The furnace temperature was increased to 400° C. for an 8-hour soak, then increased to 1200° C. for a 24-hour soak period.

About 317.6 kg (700 lbs.) of ceramic grade, high purity beryllium oxide was recovered. The BeO was characterized by a surface area of 0.4 m²/g, an average magnesium content of 0.4%, and fluorine content of 25-50 ppm. This material was tape cast to form beryllia substrates which performed better than standard tape cast UOX beryllia. Packing density of the recrystallized beryllia tape was about 60% of theoretical density compared to 50% for UOX beryllia tape. In addition, recrystallized beryllia tape was more flexible and showed less warpage, cracking and shrinkage when dried or fired for better dimensional control.

Various modifications and alterations to the present invention may be appreciated based on a review of this disclosure. These alterations are intended to be within the scope and spirit of the invention as defined by the following claims.

What is claimed is:

1. A process for producing beryllium oxide which comprises:
   (a) providing beryllium hydroxide in powdered form;
   (b) admixing with the beryllium hydroxide an effective amount of a calcination additive to promote recrystallization; and
   (c) reactively calcining the admixture at a temperature effective to cause production of beryllium oxide directly from the beryllium hydroxide.

2. The process defined by claim 1, wherein the calcination additive contains magnesium and/or calcium.

3. The process defined by claim 1, wherein the calcination additive is selected from magnesium basic carbonate, magnesium oxide and calcium carbonate.

4. The process defined by claim 1, wherein the calcination additive is present in an effective amount of at least 0.10% by weight based on the beryllium oxide.

5. The process defined by claim 4, wherein the calcination additive is present in an effective amount of 0.10% to 0.70% by weight.

6. The process defined by claim 1, wherein the calcination temperature is in the range of 1000° to 1300° C.

7. The process defined by claim 6, wherein the calcination temperature is in the range of 1050° to 1200° C.

8. The process defined by claim 1, wherein the resultant beryllium oxide is in powder form having a surface area of not more than about 1.5 m²/g.

9. The process defined by claim 1, wherein the resultant beryllium oxide has a fluorine content of less than about 650 ppm.

10. The process defined by claim 9, wherein the resultant beryllium oxide has a fluorine content of less than about 100 ppm.

11. The process defined by claim 1, wherein the calcination additive contains magnesium and the resultant beryllium oxide contains 0.3% to 0.65% magnesium.

12. The process defined by claim 1, wherein the resultant beryllium oxide has an average particle size of from 11 μm to 22 μm.

13. The process defined by claim 1, wherein the process comprises a single reaction step.

14. A composition useful for the production of beryllium oxide, which comprises beryllium hydroxide and an additive compound selected from the group consisting of magnesium basic carbonate, magnesium oxide and calcium carbonate.

15. The composition defined by claim 14, wherein the additive is magnesium basic carbonate.

16. The composition defined by claim 14, wherein the additive is present in an amount sufficient to provide 0.10% to 0.70% by weight of magnesium and/or calcium relative to the beryllium oxide.

* * * * *